(No Model.)
J. DAVIS.
CHURN DASHER.
No. 385,698. Patented July 10, 1888.
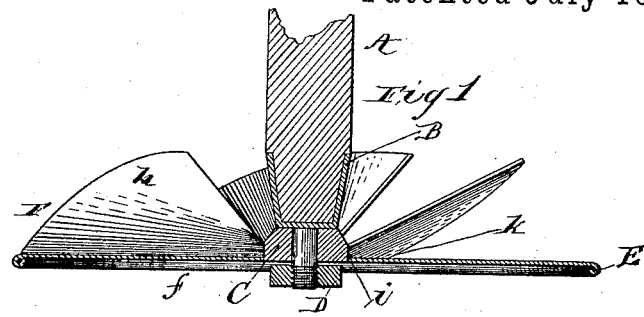
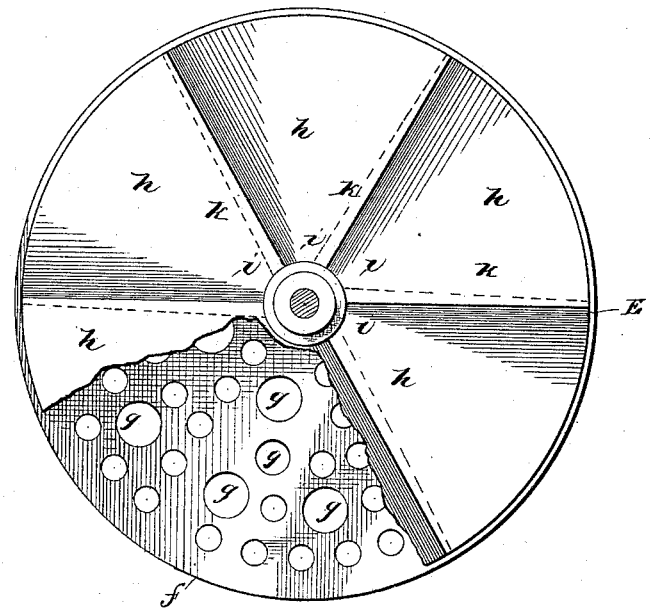
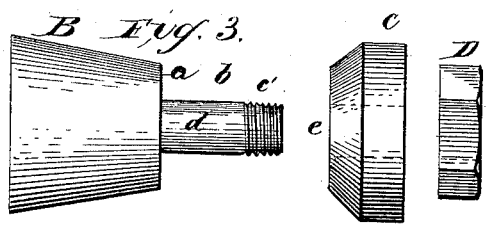
Witnesses,
Wm. H. Scott.
Wm. E. Dyre.
Inventor.
John Davis.
By Johnston, Reinohl & Dyre.
Attorneys.
N. PETERS, Photo-Lithographer, Washington, D. C.

UNITED STATES PATENT OFFICE.

JOHN DAVIS, OF ALLEGHENY, PENNSYLVANIA.

CHURN-DASHER.

SPECIFICATION forming part of Letters Patent No. 385,698, dated July 10, 1888.

Application filed November 30, 1887. Serial No. 256,540. (No model.)

*To all whom it may concern:*

Be it known that I, JOHN DAVIS, a citizen of the United States, residing at Allegheny, in the county of Allegheny and State of Pennsylvania, have invented certain new and useful Improvements in Churn-Dashers; and I do hereby declare the following to be a full, clear, and exact description of the invention, such as will enable others skilled in the art to which it appertains to make and use the same.

My invention relates to churn-dashers, and has for its object the construction of a dasher which shall effectually agitate the cream in a churn and supply oxygen thereto.

It is well known that cream is composed of globules, that each globule has a very thin coating over the butter it contains, and that the object of churning is to break the coating of the globules, which frees the butter and allows it to separate from the milk. This is effected by agitating the cream and exposing it to the atmosphere, and the dasher which accomplishes this most effectually in the shortest time is the best, other things being equal.

The invention will be hereinafter described, and particularly pointed out in the claim.

In the accompanying drawings, which form a part of this specification, Figure 1 represents a vertical section; Fig. 2, a plan with blades partly broken away; and Fig. 3, a detail of the ferrule, hub, and securing-nut.

Reference being had to the drawings and the letters marked thereon, A represents the staff; B, the ferrule, which is provided with a seat, *a*, for the hub C to bear against, and a pin, *b*, which forms the axle for the hub and the dasher to rotate upon. The pin *b* is screw-threaded at its end *c'* to an extent corresponding with the thickness of the retaining-nut D, and is provided with a plain smooth portion, *d*, upon which the bore *e* of the hub C bears in rotating. Sufficient space is left between the screw-thread on the end of the pin *b* and the shoulder or seat *a* to allow the dasher E to revolve freely in opposite directions during the down and up strokes thereof, respectively.

The dasher E is formed of a disk, *f*, provided with numerous perforations *g*, which may all be of one and the same diameter, or they may be made of several different diameters. On the upper surface of the disk *f* are secured radial blades *h*, which are secured at their inner and narrow ends, *i*, to the hub C, and on one side, *k*, to an unperforated portion of the disk *f*.

The blades or beaters *h* project from the disk *f* at an angle to its upper surface, and thereby present angular faces on their upper and lower sides for the milk or cream to impinge against and rotate the dasher toward the right in the downstroke and toward the left in the upstroke as the dasher is reciprocated in the churn.

It will be observed that the blades overlap each other slightly, thereby deflecting the milk or cream from the inner surface of one blade against the outer surface of the next adjacent blade in the downstroke, and from the outer surface of one against the inner surface of the next adjacent blade in the upstroke, thus changing the current of the milk or cream passing through the dasher from a vertical to a horizontal in one stroke, and vice versa in the opposite stroke.

By changing the currents passing through the perforations in the disk and striking against the surfaces of the blades the milk or cream is violently agitated, the globules containing the butter broken, and the butter freed.

The operation is as follows: A churn having received its full complement of cream or milk, the dasher is introduced, with its staff A projecting through the cover. The dasher is raised above the surface of the milk and accumulates air under the blades *h*, which, being carried with it into the milk in the downstroke of the dasher, aids in its agitation and supplies oxygen, which unites with the thin coating of the globules as they are broken. The rapid motion of the dasher downward causes the milk to pass up through the perforations and strike the lower surface of the blades *h* with sufficient force to free the butter from its cells. At the same time the apertures in the disk *f* divide the milk into numerous streams, which are brought in contact with the metal as the milk passes through the apertures and assists in the separation of the butter from the milk. While this operation is going on the dasher is being rotated by the force of the milk striking the lower surface of the blades *h*, which cuts the streams, diverts them from a vertical plane to an angular, then into a horizontal plane, and produces a violent agitation of the milk. On the upstroke of the dasher the reverse operation is produced. After butter has been formed it is gathered upon the upper surface of the dasher by gently moving it up and down under the surface of the milk. It is then removed and worked in the usual manner.

I am aware that dashers have heretofore been made in which a series of openings were partially covered with blades; but in such construction the cream passed through each opening in one large unbroken body, and only one side of the body came in contact with the blade, while a large percentage of the cream passed through the opening without impinging against the blade. I am also aware that a dasher has been made in which a fixed disk has had a few perforations near its center, and above said disk was a dasher having two horizontal side wings. When the wings were used as dashers, they were raised vertically above the lower disk and the cream passed through the perforations in the disk without being discharged against the wings. Should the wings be allowed to remain in their normal position for gathering butter, and the dasher reciprocated, cream would pass through the perforations in the downstroke of the dasher only, raise the hinged wings, and a very small percentage of the cream caused to impinge against the wings, while in the upstroke of the dasher no cream could pass through the perforations, for the reason that ingress thereto was cut off by the hinged wings covering them. I do not therefore claim any such constructions.

Having thus fully described my invention, what I claim is—

A churn-dasher provided with a disk having numerous perforations and imperforate portions separating the perforations into groups, in combination with a series of angular blades covering each group of perforations and secured to the imperforate portions of the disk, whereby the cream is divided into numerous small streams, deflected from one blade against another, violently agitated, and the globules broken in passing through the perforations and striking against the blades, substantially as described.

In testimony whereof I affix my signature in presence of two witnesses.

JOHN DAVIS.

Witnesses:
H. HUNNESHAGEN,
J. R. BAIRD.